United States Patent [19]

Grapes et al.

[11] Patent Number: 4,487,442
[45] Date of Patent: Dec. 11, 1984

[54] PELICAN HOOK ASSEMBLIES AND METHODS OF MANUFACTURING THE SAME

[75] Inventors: Eugene F. Grapes, Pittsburgh; W. W. Patterson, III, Sewickly Heights, both of Pa.

[73] Assignee: W. W. Patterson Company, Pittsburgh, Pa.

[21] Appl. No.: 428,253

[22] Filed: Sep. 29, 1982

[51] Int. Cl.$^3$ ............................................... B66C 1/36
[52] U.S. Cl. ............................... 294/83 R; 24/241 PS
[58] Field of Search ................... 294/82 R, 83, 78 R, 294/84; 24/241 PS, 241 SL, 241 SB, 241 S, 277, 230.5 R; 403/43, 44, 45, 48, 40

[56] References Cited

U.S. PATENT DOCUMENTS 3,938,844  2/1976  Johnson, Jr. ...................... 294/83 R
4,372,016  2/1983  LaViolette et al. ............. 24/241 PS

FOREIGN PATENT DOCUMENTS 447051  12/1912  France .......................... 24/241 PS

OTHER PUBLICATIONS

W. W. Patterson Company, "Patterson Fast Ratchet".

Primary Examiner—James B. Marbert
Attorney, Agent, or Firm—Buell, Ziesenheim, Beck & Alstadt

[57] ABSTRACT

A fabricated pelican hook assembly is provided having an apertured head piece cut from steel plate, a bolt threaded at one end and having the opposite end extending into said aperture at least half way through said head piece and transverse thereto, a pair of generally parallel spaced apart side arms cut from steel plate having one end of each extending generally transversely into said aperture in the head piece from the side opposite the bolt on opposite sides of said opposite end of said bolt at least half the thickness of said head piece, a weldment substantially filling said aperture around said opposite end of the bolt and the ends of the side arms, a pelican hook cut from steel plate and having a pivot hole at one end, a pivot pin extending through said pivot hole and fixed in the opposite ends of said pair of side arms with the pelican hook between said side arms and a keeper link generally movable on the bolt to engage the opposite end of the pelican hook from the pivot.

6 Claims, 9 Drawing Figures

PELICAN HOOK ASSEMBLIES AND METHODS OF MANUFACTURING THE SAME

This invention relates to pelican hook assemblies and methods of making pelican hook assemblies and particularly to a new and novel fabricated pelican hook structure designed to reduce cost and markedly improve the safety of such structures.

Pelican hook assemblies are used in large numbers in the marine industry in particular where they are incorporated in various forms of lashing apparatus, such as barge and towboat ratchets and containership ratchet turnbuckles. Pelican hook assemblies have historically been made by casting and forging, usually as an integral part of a threaded bolt adapted to thread into a barrel to form part of a ratchet assembly. This type of structure is expensive to make and requires skill and equipment which makes the end product costly. In addition, conventional pelican hook assemblies used in ratchets have the problem that they tend to rotate with the barrel of the ratchet on tightening which makes take-up slow and inefficient. We have in the past attempted to solve the problem by inserting long bolts through the pelican hook pivot which extend to both sides of the hook and act to prevent its rotation. Another problem with conventional pelican hooks is that the hook, after prolonged use, will gradually deform and change in shape so that it will reach a safety limit unnoticed and will release under load without warning.

All of the foregoing problems are solved by pelican hook assemblies of various embodiments of this invention.

We have invented a pelican hook assembly which is fabricated from rolled steel plate and which can be formed to prevent rotation and to signal a dangerous deformation of the pelican hook. The assembly of this invention is thus much less costly, much safer and far more efficient than prior art pelican hook assemblies.

We provide a fabricated pelican hook assembly made up of an apertured head piece cut from rolled steel plate, a bolt having one end extending generally transversely into an aperture in said head piece and the opposite end threaded, a pair of generally parallel spaced side arms cut from rolled steel plate having one end of each extending generally transversely into said aperture in the head piece on opposite sides of said one end of the bolt, a weldment substantially filling said aperture around said bolt end and side arm ends, a pelican hook cut from rolled steel plate and having a pivot hole at one end, a pivot pin extending through said pivot hole and fixed in the opposite ends of said spaced side arms, and a keeper link generally movable on said bolt to engage the opposite end of said pelican hook. Preferably the head piece is formed with generally sidewise extending anti-rotation legs and is continuously flame cut from a rolled steel plate. The legs are preferably continuously flame cut and formed to elevate the pelican hook and ratchet barrel above a deck surface on which they are used. The pelican hook is preferably formed with a safety notch to prevent unexpected release of the keeper link and the keeper link is formed to engage, preferably by resilient urging the pelican hook end.

In the foregoing general description we have set out certain objects, purposes and advantages of this invention. Other objects, purposes and advantages of this invention will be apparent from a consideration of the following description and the accompanying drawings in which.

Figure 1:
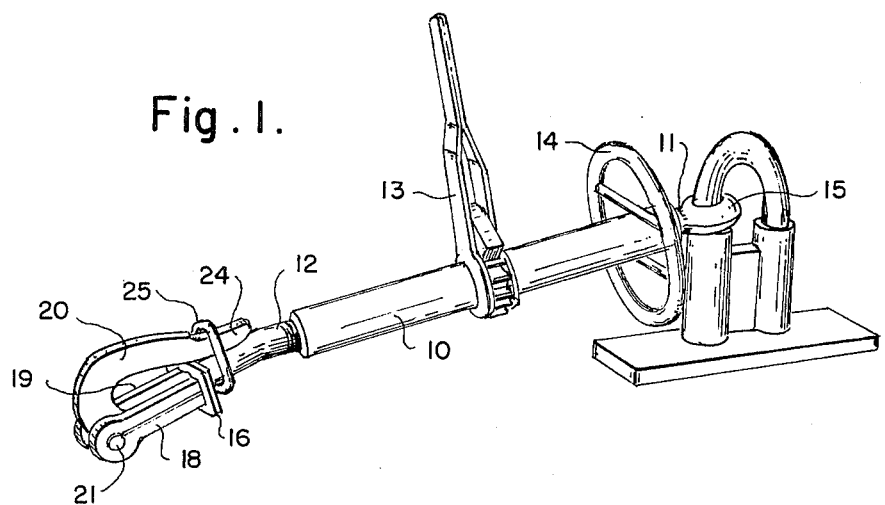
FIG. 1 is an isometric view of a ratchet incorporating a pelican hook assembly according to this invention.
Figure 2:
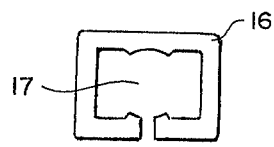
FIG. 2 is a side elevational view of a head piece as used in the pelican hook assembly of FIG. 1.
Figure 3:
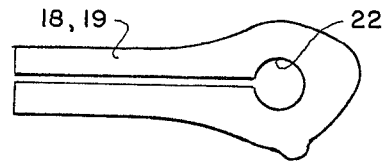
FIG. 3 is a side elevational view of a side arm of the hook assembly of FIG. 1.
Figure 4:
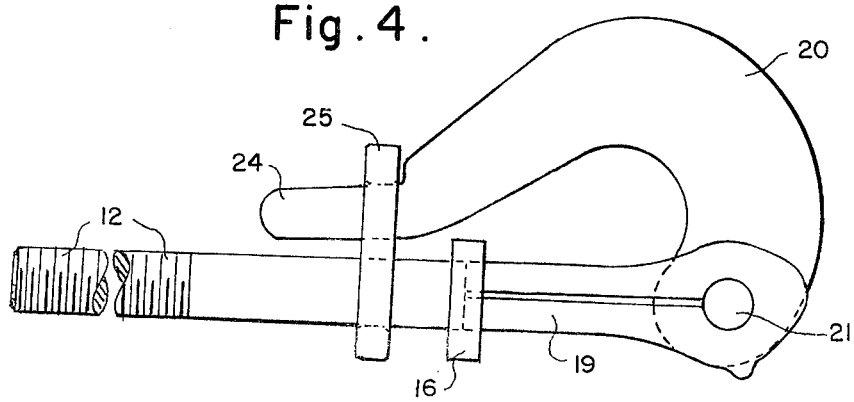
FIG. 4 is an enlarged side elevational view, partly cut away, showing the assembled pelican hook assembly of FIG. 1.

Referring to the drawings and particularly to FIGS. 1 through 4 we have illustrated a pelican hook assembly of this invention incorporated in one end of a ratchet lashing device for a shipboard and like use. The ratchet structure is made up of a rotary barrel 10 and two bolt ends 11 and 12 of opposite thread, threaded into opposite ends of barrel 10. Barrel 10 is provided with a conventional ratchet handle 13 and quick tightening hand wheel 14. One bolt 11 is provided with a standard clevis 15. The other bolt 12 is provided with a pelican hook assembly according to this invention. The pelican hook assembly is made up of a head piece 16 of generally rectangular shape having a hole 17 in the center which has a central portion of generally circular shape to receive the end of bolt 12 and a pair of generally rectangular portions to receive one end of each of a pair of side arms 18 and 19 alongside the bolt end. The head piece 16 and side arms 18 and 19 are continuously flame cut from 33 max steel and are assembled with the bolt 12 on one side of the head piece 16 and the side arms 18 and 19 on the other, with the bolt and side arms meeting approximately half way through the thickness of the head piece. The bolt 12 and side arms 18 and 19 are welded into the head piece by fully filling the opening or hole 17 with weld metal. A pelican hook 20 is inserted between the other ends of side arms 18 and 19 on a shaft 21 which extends through a hole in the pelican hook and is held in holes 22 in the side arms. The pelican hook 20 extends over head piece 16 and has a free end 24 which extends parallel to bolt 12 and is releasably fastened thereto by keeper 25 in usual fashion.

Figure 5:
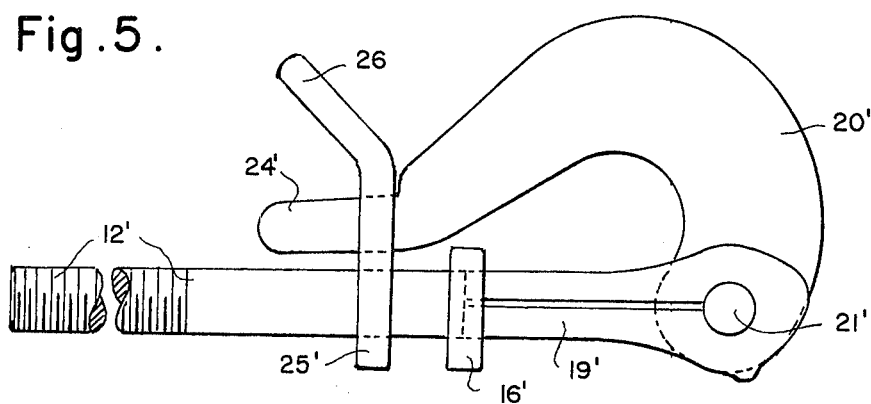
FIG. 5 is a side elevational view of a second embodiment of pelican hook assembly according to this invention.

In FIG. 5 we have illustrated a modified form of keeper having a bit portion 26 extending above the keeper and pelican hook. The bit portion 26 makes it possible to quickly release the pelican hook by striking the bit portion with a hammer as the ratchet is almost released, thus eliminating the time lost in making the last several rotations of the ratchet necessary to make a keeper 25 finger releasable. All other like parts bear like numbers with a prime sign.

Figure 6:
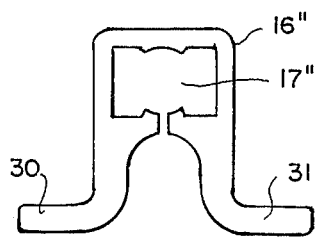
FIG. 6 is an end elevational view, partly in section, of a third embodiment of this invention.

The form of pelican hook assembly illustrated in FIG. 6 provides a head piece 16' having sidewise extending arms 30 and 31 extending outwardly from its side. These arms 30 and 31 bear on a ship deck or similar surface and act both to elevate the ratchet so that it does not rub on the deck while the barrel is rotated and prevents rotation of the bolt 12' and pelican hook along with the barrel as the ratchet is tighted or loosened. This markedly increases the speed and efficiency of the ratchet.

Figure 7:
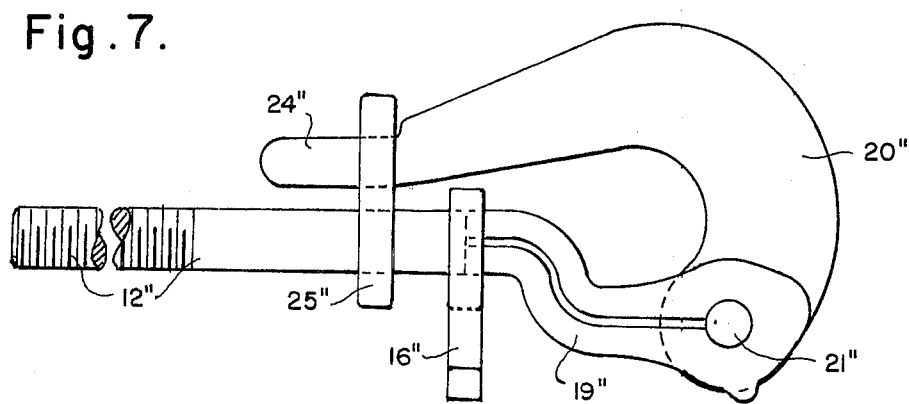
FIG. 7 is a side elevational view of a fourth embodiment of this invention.

In FIG. 7 we have illustrated another embodiment of our invention in which the side arms 18" and 19" are contoured so as to provide a drop in the position of pivot shaft 21" so that it lies in a plane below the plane of the bolt 12". This acts to elevate the ratchet barrel away from the deck surface.

Figure 8:
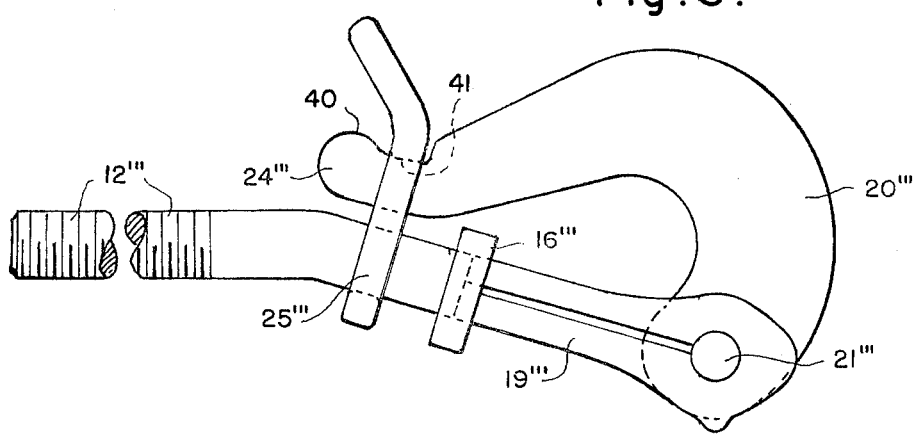
FIG. 8 is a side elevational view of a fifth embodiment of this invention.
Figure 9:
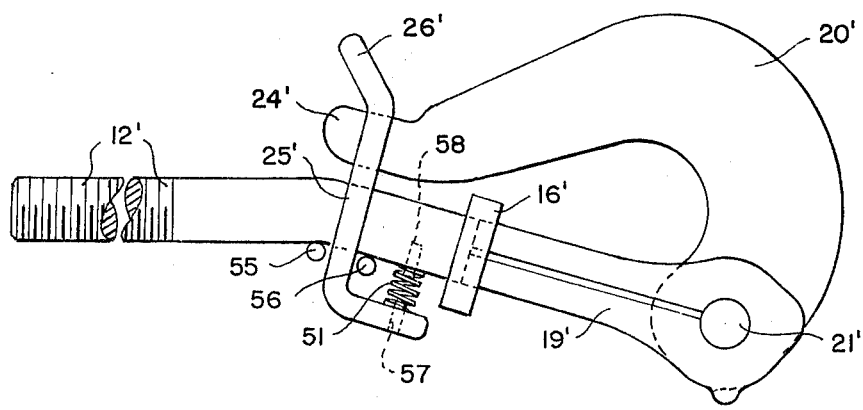
FIG. 9 is a side elevational view of a sixth embodiment of this invention.

The embodiments of FIGS. 8 and 9 provide modified keeper and pelican hook ends designed to make latch up easier and to prevent the pelican hook from being used when it has been distorted beyond safe limits. In FIG. 8 we provide a pelican hook 20' having a free end 24' formed with a semi-circular latch portion 40 on the side opposite bolt 12'. A keeper 25' is adapted to pass over latch portion 40 and rest against the latch portion 40 at its intersection 41 with the body of the pelican hook. When the pelican hook 20' is under load, the latch portion 40 prevents the keeper 25' from slidingly releasing the pelican hook free end 24' in those cases where the pelican hook is so heavily loaded as to cause it to be stretched and deformed, a common cause of failure. In FIG. 9, we illustrate a pelican hook similar to that of FIG. 8, however, the keeper 25' is pivoted on bolt 12' by means of a keyhole shaped opening and is provided with a transverse flange 50 on the side opposite the pelican hook free end. The keeper 25' has a keyhole shaped opening, the large part fitting around bolt 12' and the slotted portion sliding over the free end 24' of pelican hook 20'. A spring 51 held by retainer pins 57 and 58 between the flange 50 and bolt 12' urges the keeper in rotation about bolt 12' between stops 55 and 56. The opposite end of the keeper from flange 50 is provided with bit portion 26' which is inclined to the main body of the keeper and acts as a guide for the free end of the pelican hook during hook-up. Thus when the free end 24' of the pelican hook 20' is pressed downwardly toward bolt 12', it strikes the bit portion 26' and travels down its incline, forcing the keeper to rotate on the bolt until free end 24' enters the opening in the keeper, whereupon the keeper is urged by the spring 51 to rotate in the opposite direction over latch portion 40' to rest in locking arrangement in intersection 41' of the latch portion and body of the pelican hook.

In the foregoing specification we have set out certain preferred embodiments and practices of our invention, however, it will be understood that this invention may be otherwise embodied within the scope of the following claims.

We claim:

1. A fabricated pelican hook assembly comprising an apertured head piece cut from steel plate, a bolt threaded at one end and having the opposite end extending into said aperture at least half way through said head piece and transverse thereto, a pair of generally parallel spaced apart side arms cut from steel plate having one end of each extending generally transversely into said aperture in the head piece from the side opposite the bolt and on opposite sides of said opposite end of said bolt at least half the thickness of said head piece, a weldment substantially filling said aperture around said opposite end of the bolt and the ends of the side arms fixing said bolt and side arms in said head piece and forming a unitary structure, a pelican hook cut from steel plate and having a pivot hole at one end, a pivot pin extending through said pivot hole and fixed in the opposite ends of said pair of side arms with the pelican hook between said side arms and a keeper link generally movable on the bolt to engage the opposite end of the pelican hook from the pivot.

2. A fabricated pelican hook assembly as claimed in claim 1 wherein the head piece is provided with sidewise extending anti-rotation legs.

3. A fabricated pelican hook assembly as claimed in claim 1 or 2 wherein the keeper latch is provided with an upstanding bit portion.

4. A fabricated pelican hook assembly as claimed in claim 1 or 2 wherein the pelican hook is provided with a latch member on the end opposite the pivot which latch member is engaged by the keeper.

5. A fabricated pelican hook assembly as claimed in claim 4 wherein the latch member is a semi-circular portion.

6. A fabricated pelican hook assembly as claimed in claim 5 wherein the keeper is provided with a transverse flange extending along the bolt on the side opposite the pelican hook and resilient means between said flange and bolt urging the keeper onto the end of the pelican hook over the latch means.

* * * * *